United States Patent
Marsilio et al.

(10) Patent No.: US 7,740,214 B2
(45) Date of Patent: Jun. 22, 2010

(54) DISPLAY HAVING SELF-ORIENTING MOUNTING AREA

(75) Inventors: Ronald M. Marsilio, Lake Wiley, SC (US); Dennis D. Belden, Jr., Waxhaw, NC (US)

(73) Assignee: Invue Security Products Inc., Charlotte, NC (US)

( * ) Notice: Subject to any disclaimer, the term of this patent is extended or adjusted under 35 U.S.C. 154(b) by 609 days.

(21) Appl. No.: 11/431,291

(22) Filed: May 10, 2006

(65) Prior Publication Data

US 2007/0145209 A1 Jun. 28, 2007

Related U.S. Application Data

(60) Provisional application No. 60/754,138, filed on Dec. 27, 2005.

(51) Int. Cl.
*F16M 11/02* (2006.01)
(52) U.S. Cl. ............ 248/178.1; 248/187.1; 248/206.5; 340/568.8
(58) Field of Classification Search .............. 248/177.1, 248/178.1, 187.1, 206.5, 229.11, 521, 523, 248/289.31; 340/568.1, 568.8, 572.6
See application file for complete search history.

(56) References Cited

U.S. PATENT DOCUMENTS

| | | | | |
|---|---|---|---|---|
| 5,146,205 A | * | 9/1992 | Keifer et al. ............. 340/568.2 |
| 5,669,516 A | * | 9/1997 | Horn ......................... 211/70.6 |
| 6,042,080 A | * | 3/2000 | Shepherd et al. ............ 248/683 |
| 6,476,717 B1 | * | 11/2002 | Gross et al. .............. 340/568.1 |
| 6,663,073 B1 | | 12/2003 | Church |
| 6,896,543 B2 | * | 5/2005 | Fort et al. .................... 439/501 |
| 7,249,864 B2 | * | 7/2007 | Smith et al. .................. 362/183 |
| 7,287,652 B2 | * | 10/2007 | Scholen et al. ................. 211/26 |
| 2003/0151510 A1 | * | 8/2003 | Quintana et al. ......... 340/568.2 |
| 2007/0114346 A1 | * | 5/2007 | Omps ...................... 248/181.1 |

\* cited by examiner

*Primary Examiner*—A. Joseph Wujciak, III
(74) *Attorney, Agent, or Firm*—Christopher C. Dremann, P.C.

(57) ABSTRACT

A display assembly for automatically orienting a display item includes a base and a mounting member for mounting thereon the display item. The mounting member is removably mounted on the base to allow handling of the display item when removed and when mounted automatically moves from an unaligned orientation to an aligned display orientation. One alignment mechanism is magnetically operable and preferably includes first and second magnets respectively mounted on the base and mounting member wherein north and south poles of the first magnet align respectively with south and north poles of the second magnet to align the mounting member in the display orientation. Another alignment mechanism includes at least one camming surface for facilitating alignment of the mounting member and preferably camming surfaces respectively on the base and the mounting member which engage one another to facilitate to alignment.

6 Claims, 13 Drawing Sheets

DISPLAY HAVING SELF-ORIENTING MOUNTING AREA

CROSS REFERENCE TO RELATED APPLICATIONS

This application claims priority from U.S. Provisional Application Ser. No. 60/754,138 filed Dec. 27, 2005; the disclosure of which is incorporated herein by reference.

BACKGROUND OF THE INVENTION

1. Technical Field

The invention relates generally to display stands for merchandise. More particularly, the invention relates to a display stand which allows the handling of an item of merchandise. Specifically, the invention relates to such a display stand which orients the item of merchandise to a desired display orientation after the handling thereof.

2. Background Information

Amongst the great variety of display structures used to display items of merchandise are those which allow a potential customer to handle and view the item of merchandise in order to determine if it has characteristics desirable to the potential customer. This is commonly the case for displaying various types of electronic articles such as cell phones, cameras and the like which have a reasonably high unit value but which a retailer desires to allow the potential customer to handle without seeking a store employee simply to unlock the merchandise for such viewing and handling. In addition to the need to provide security against theft of such items, there is also a need to display the items of merchandise in an orderly manner. This often becomes a problem when a potential customer picks up an item of merchandise such as a cell phone or camera in order to look it over and see how it feels, and then places the item generally in the display area from which it was obtained but in a haphazard manner. Especially because multiple items of such merchandise are displayed near one another, when they are all replaced haphazardly, it creates quite a disorderly appearance. The present invention addresses this and other problems.

BRIEF SUMMARY OF THE INVENTION

The present invention provides a display assembly comprising a base; a mounting member adapted for mounting thereon a display item; wherein the mounting member is movable between a mounted position in which the mounting member is in contact with the base and a removed position in which the mounting member is movable so that the mounting member is adapted to facilitate viewing and handling of the display item; wherein the mounting member when in the mounted position is movable between an unaligned orientation and an aligned display orientation; and an alignment mechanism for automatically moving the mounting member from the unaligned orientation to the display orientation.

BRIEF DESCRIPTION OF THE SEVERAL VIEWS OF THE DRAWINGS

Similar numbers refer to similar parts throughout the drawings.

DETAILED DESCRIPTION OF THE INVENTION

Figure 1:
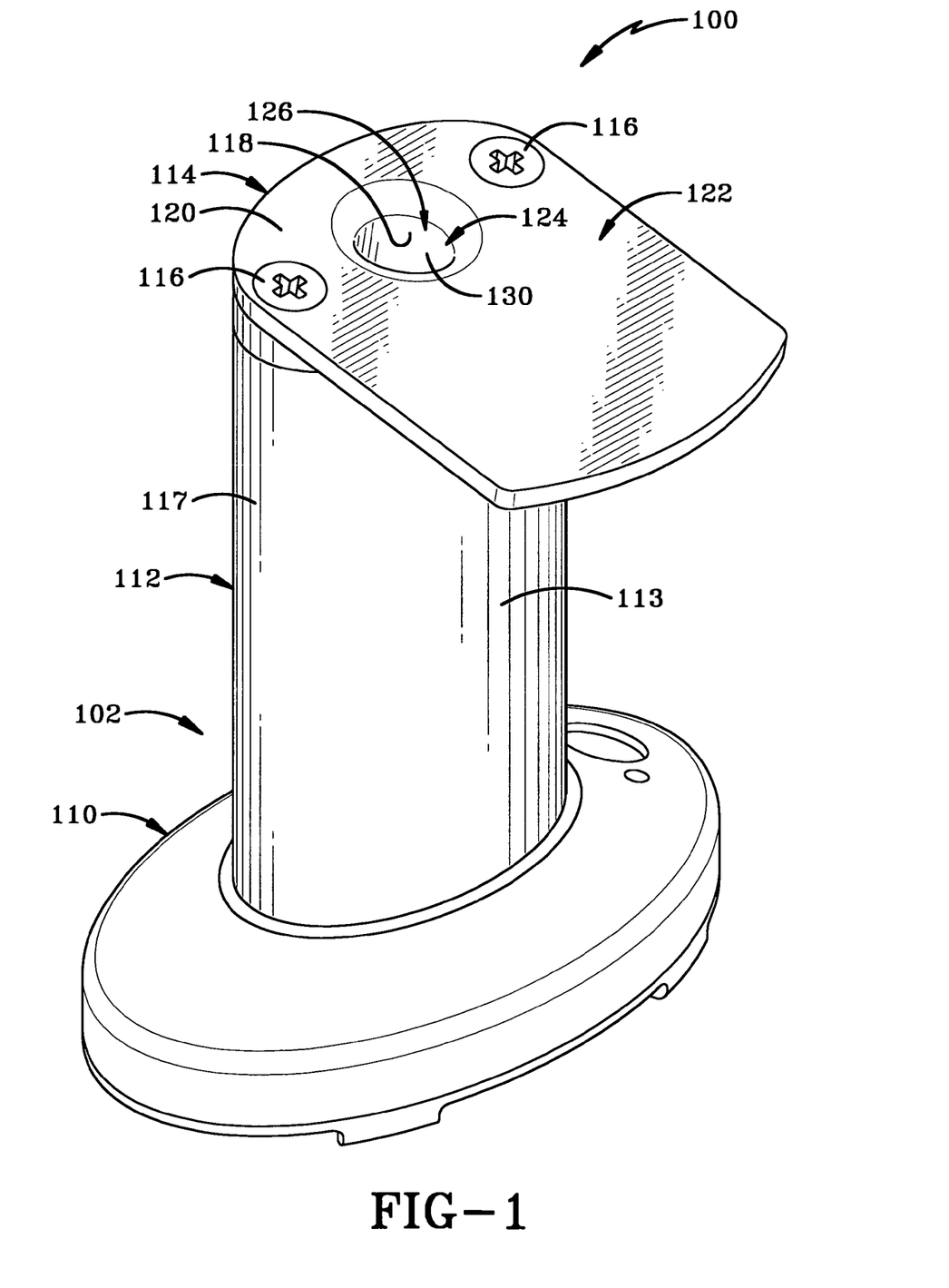
FIG. 1 is a perspective view of a first embodiment of the base of the display device of the present invention.
Figure 2:
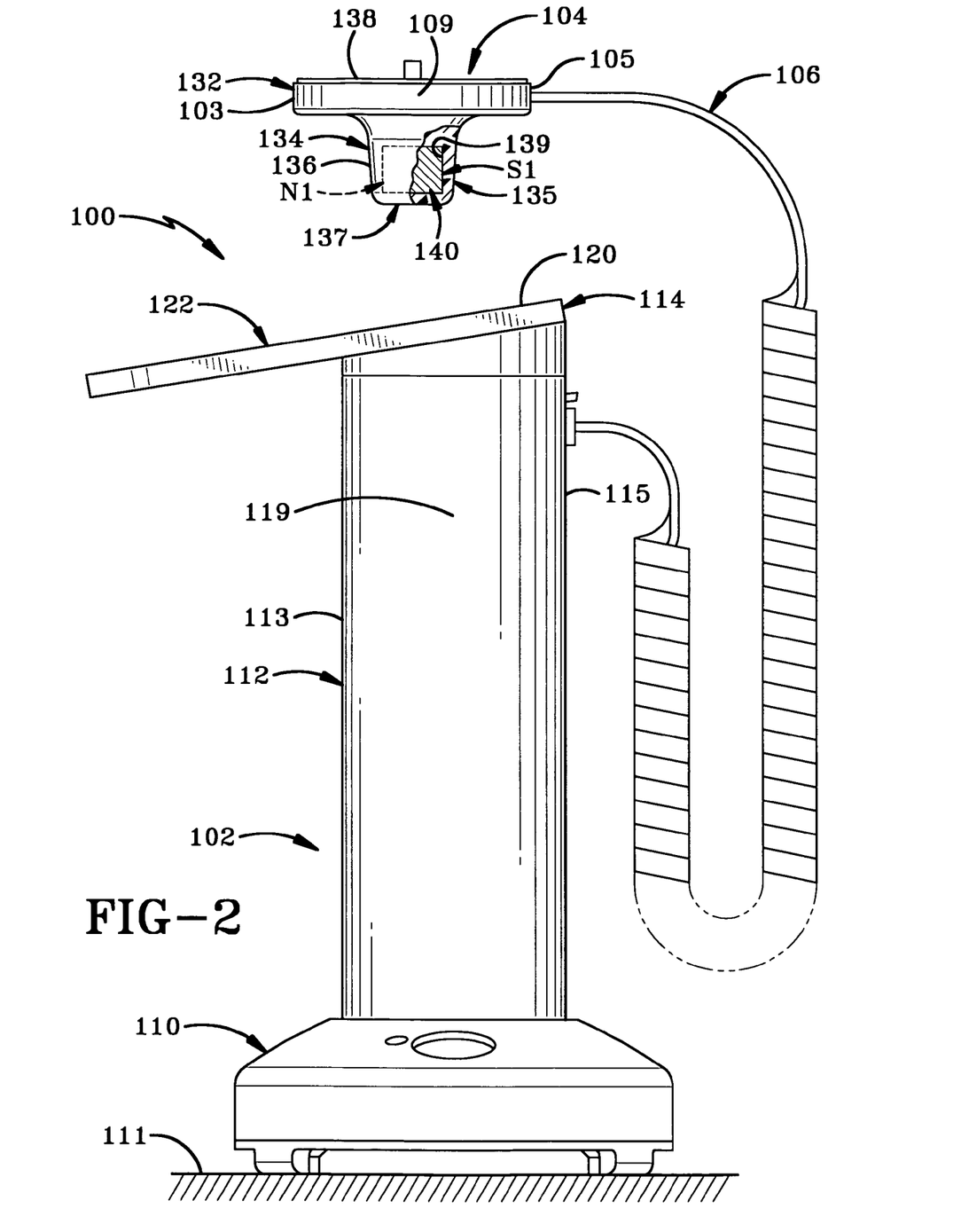
FIG. 2 is a side elevational view of the first embodiment of the display device.
Figure 3:
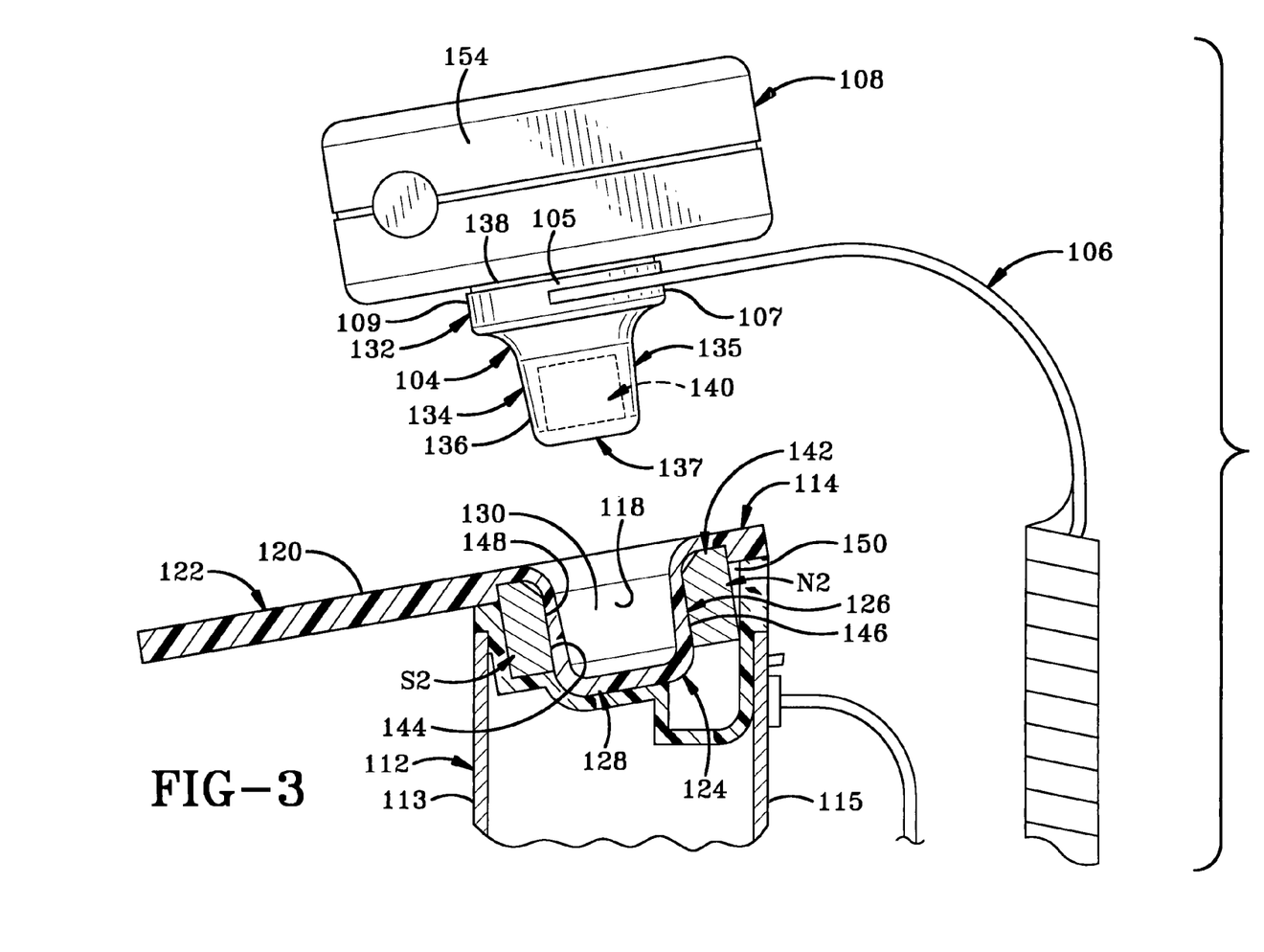
FIG. 3 is a fragmentary exploded view with portions in section showing the mounting member with an item of merchandise mounted thereon and removed from the base.
Figure 9:
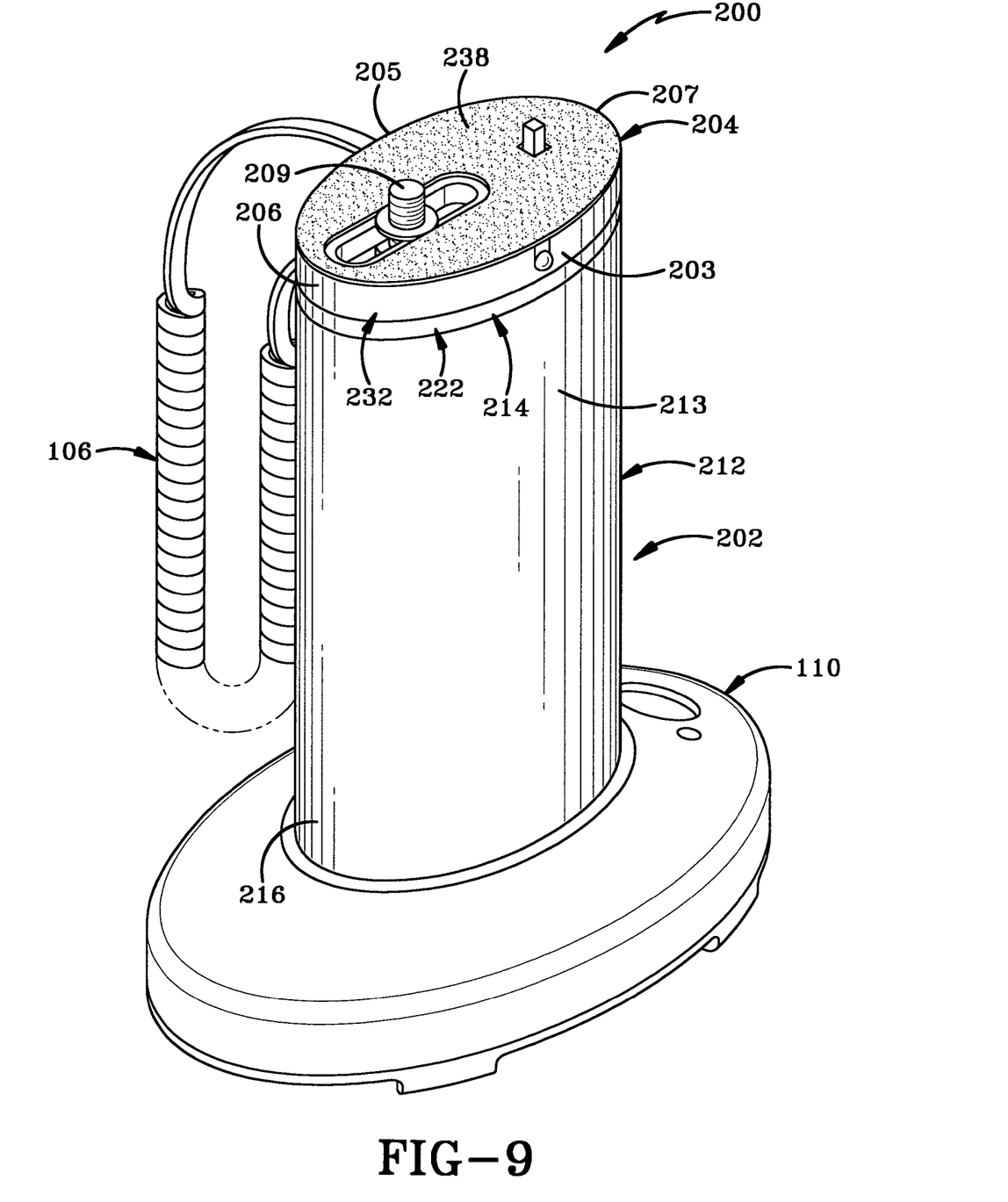
FIG. 9 is a perspective view of a second embodiment of the display device of the present invention showing the mounting member mounted on the base.
Figure 10:
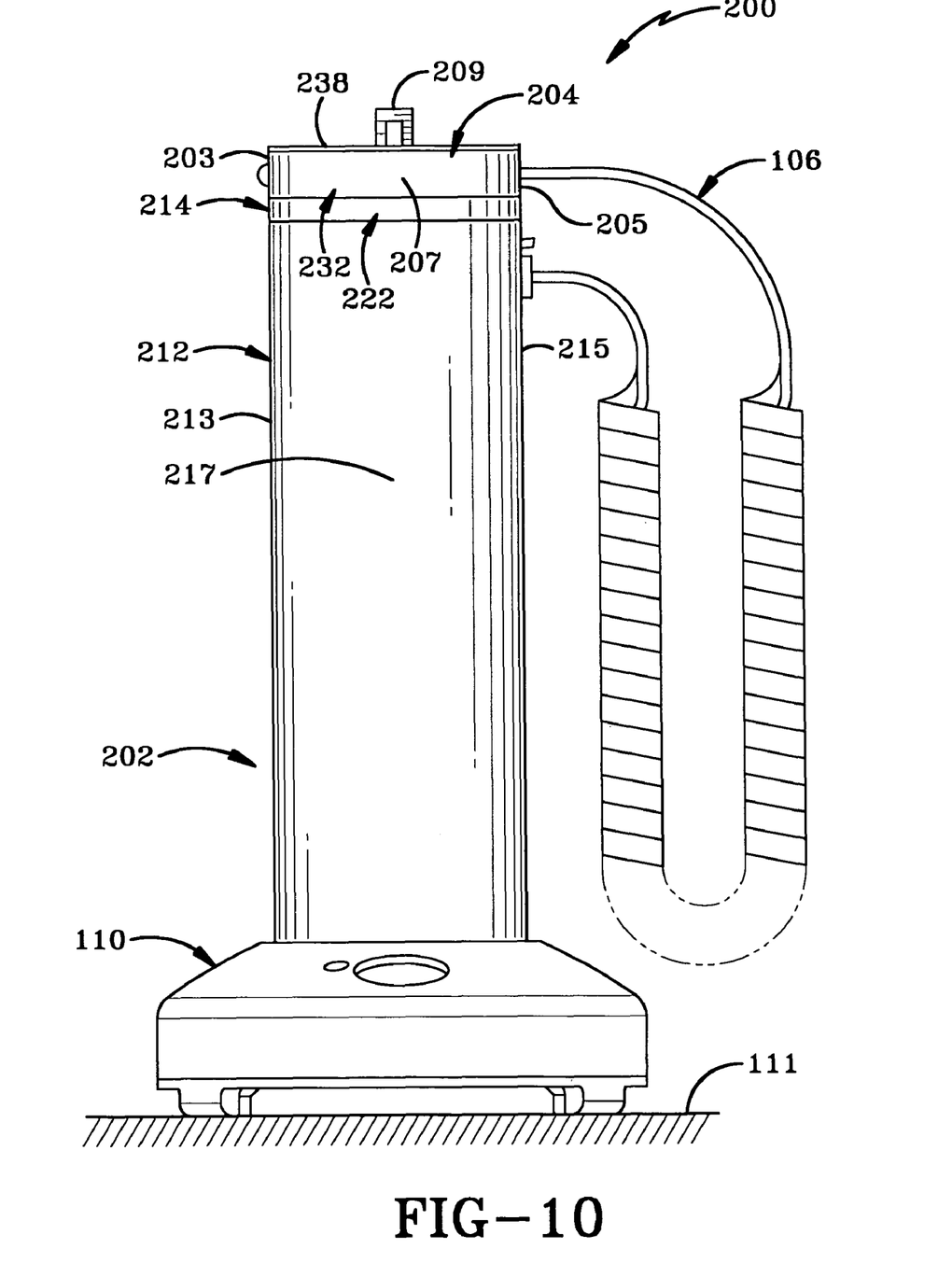
FIG. 10 is a side elevational view of the display device shown in FIG. 9.
Figure 11:
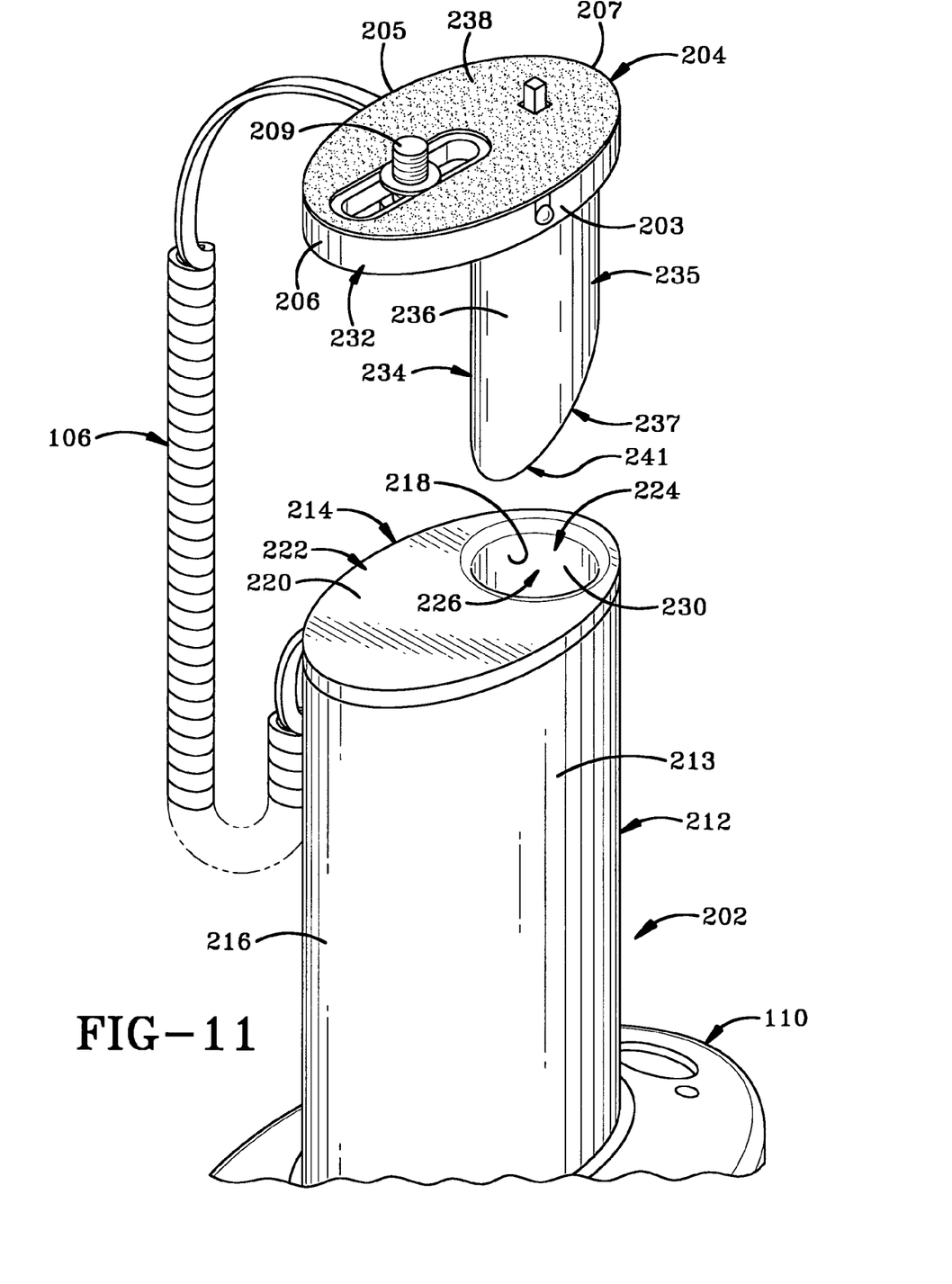
FIG. 11 is a fragmentary perspective view of the second embodiment showing the mounting member removed from the base.

A first embodiment of the display assembly or display stand of the present invention is indicated generally at 100 in FIGS. 1-2; and a second embodiment is indicated generally at 200 in FIGS. 9-11. Referring to FIGS. 1-2, stand 100 includes a base 102, a mounting member 104 which is removably mountable on base 102 and a tether 106 which is connected to and extends between base 102 and mounting member 104. Mounting member 104 has a front 103, an opposed rear 105 and first and second sides 107 and 109, which are noted herein primarily as points of reference to clarify the movement of mounting member 104 as later detailed. Mounting member 104 is configured for mounting thereon an item of merchandise or display item such as cell phone 108 (FIG. 3) in order to allow the item of merchandise to be moved away from base 102 in order to view and handle said item. Base 102 includes a foundation 110 which is seated on a support surface 111, an upwardly projecting column 112 which extends upwardly from foundation 110 and a seating member 114 which is connected to a top end of column 112 via a pair of fasteners in the form of screws 116. Column 112 has a front, an opposed rear 115 and first and second opposed sides 117 and 119, which are also noted herein primarily as points of reference to clarify the movement of mounting member 104 as detailed below.

Seating member 114 defines an opening 118 which extends downwardly from an upper surface 120 of seating member 114. More particularly, seating member 114 includes a substantially flat seating plate 122 and a cup-shaped member 124. Cup-shaped member 124 includes a cylindrical side wall 126 which extends downwardly from plate 122 and a bottom wall 128 (FIG. 3) connected to side wall 126 from which side wall 126 extends upwardly. Cup-shaped member 124 has a smooth inner surface 130.

Mounting member 104 includes a merchandise mounting portion 132 and a base mounting portion in the form of a post 134 which extends downwardly from portion 132. Post 134 includes a cylindrical or frustoconical side wall 135 extending downwardly from mounting portion 132 and a bottom wall 137 connected to side wall 135 such that side wall 135 and bottom wall 137 define therein an interior chamber 139. Sidewall 135 has a generally frustoconical or cylindrical outer surface 136 of a mating configuration with inner surface 130 of cup-shaped member 124. Outer surface 136 is smooth so that friction between surface 136 and surface 130 is reduced to facilitate slidable engagement therebetween when post 134 is disposed in opening 118. Mounting portion 132 has an upper surface 138 on which cell phone 108 is mountable.

In accordance with a feature of the invention, a first magnet 140 is disposed within interior chamber 139 of post 134 and a second magnet 142 (FIG. 3) is mounted on base 102 adjacent and external to cup-shaped member 124. First magnet 140 has a north pole N1 and a south pole S1. Second magnet 142 is a ring magnet which defines a central magnet opening 144 in which side wall 126 of cup-shaped member 124 is disposed with an outer surface 146 of side wall 126 abutting an inner surface 148 of magnet 142. Magnet 142 is mounted within an interior chamber 150 defined by column 112 adjacent an upper end thereof. Second magnet 142 has a north pole N2 and a south pole S2 which magnetically attract respectively south pole S1 and north pole N1 of first magnet 140 to align mounting member 104 and cell phone 108 when mounted thereon in an aligned display orientation when post 134 is disposed within opening 118 of base 102. In addition, repelling forces are also provided between south poles S1 and S2 and between north poles N1 and N2 which assist in the rotation of mounting member 104 and cell phone 108 to the aligned display orientation.

Tether 106 is preferably of a configuration which allows for extension and retraction thereof, such as a coiled wire, here shown as a standard telephone cord. Tether 106 may thus also provide electrical communication between base 102 and mounting member 104 to, for example, provide a security alarm should cell phone 108 be removed from mounting member 104 or should the electrical connection provided by tether 106 be compromised in some fashion. Base 102 may be free standing although it is generally preferable that base 102 be secured to support surface 111.

Figure 4:
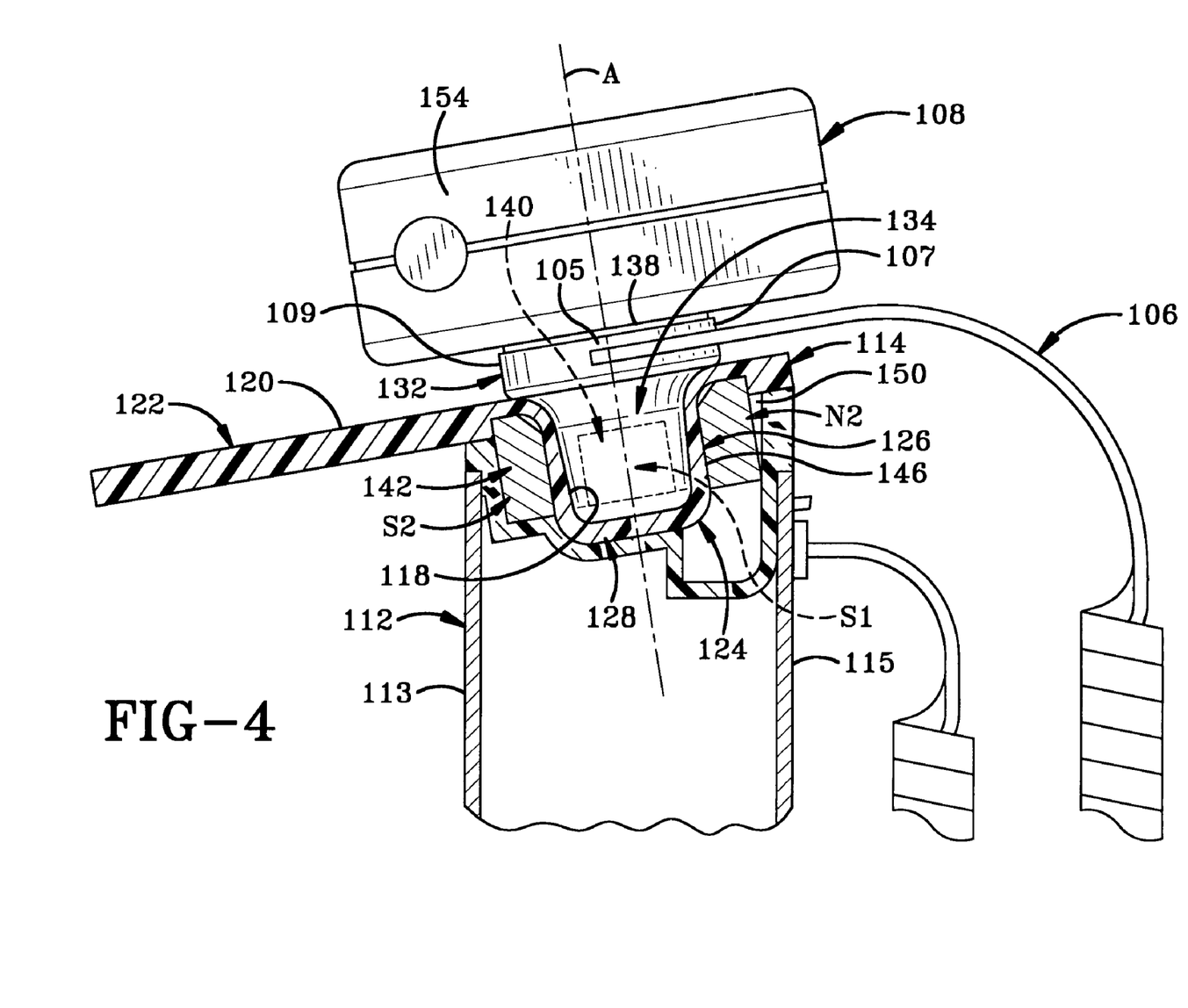
FIG. 4 is similar to FIG. 3 and shows the mounting member seated on the base.
Figures 5, 6, 7:
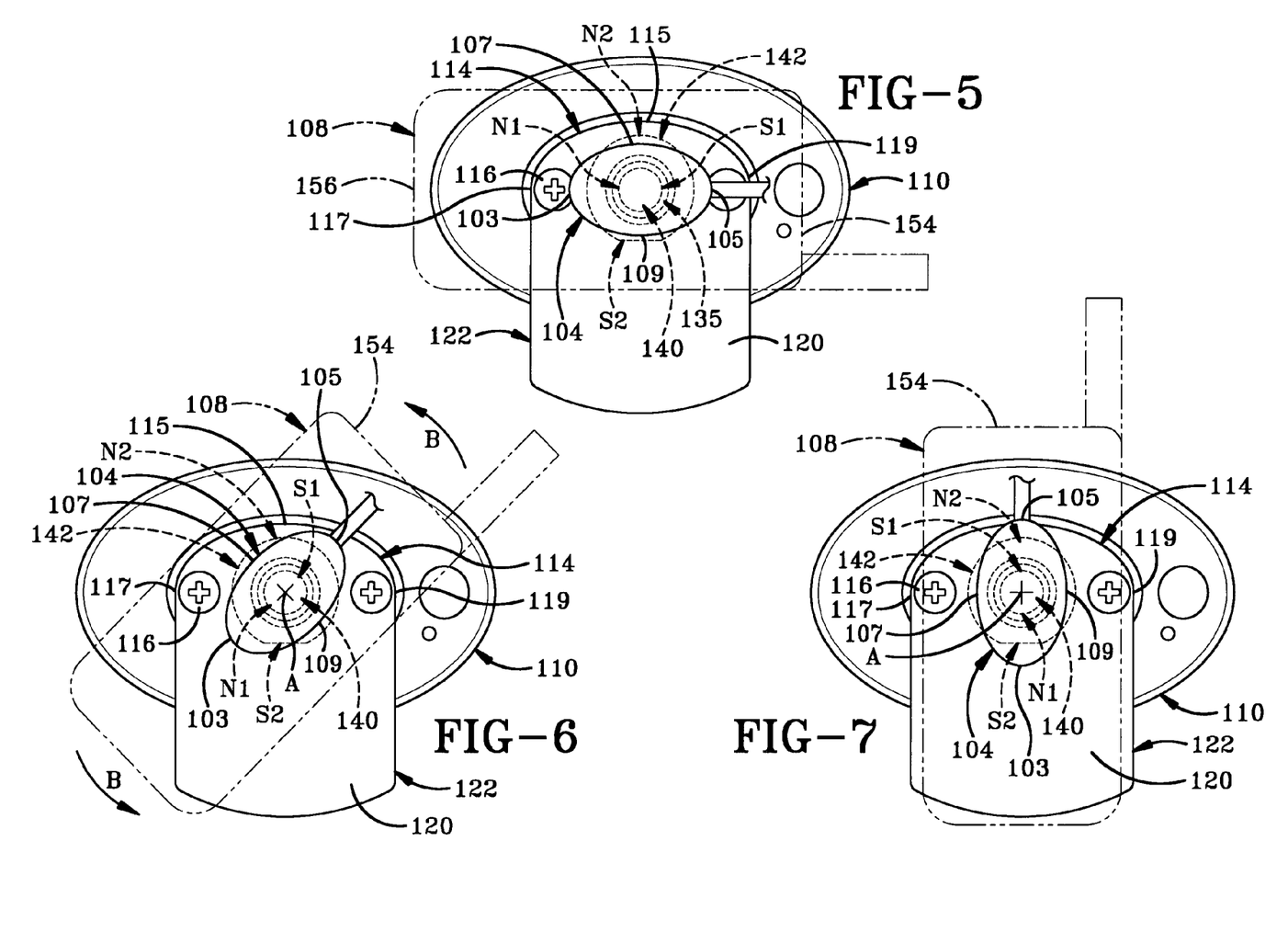
FIG. 5 is a top plan view with portions cut away showing the mounting member and item of merchandise in dot dashed lines seated on the base in the unaligned orientation.
FIG. 6 is similar to FIG. 5 and shows the mounting member and article of merchandise rotating away from the position shown in FIG. 5 toward the aligned display orientation.
FIG. 7 is similar to FIG. 6 and shows the mounting member and item of merchandise in the aligned display orientation.

The operation of display stand 100 is described with reference to FIGS. 4-8. FIG. 4 shows mounting member 104 mounted on base 102 with post 104 disposed in opening 118 in an unaligned orientation. More particularly, north and south poles N1 and S1 of first magnet 140 are not respectively aligned with south and north poles S2 and N2 of second magnet 142. As shown in FIG. 4, south pole S1 of first magnet 140 is generally offset approximately 90° from north pole N2 of second magnet 142. As seen in FIG. 4, rear 105 of member 104 is generally aligned with south pole S1 of first magnet 140 and is thus approximately 90° offset from either of north pole N2 and south pole S2 of magnet 142. In addition, a top 154 and bottom 156 of cell phone 108 provide reference points. FIG. 4 shows top 154 also generally aligned with rear 105 of member 104 and south pole S1 of first magnet 140. FIG. 5 shows mounting member 104 and cell phone 108 from above in the unaligned orientation as shown in FIG. 4.

Figure 8:
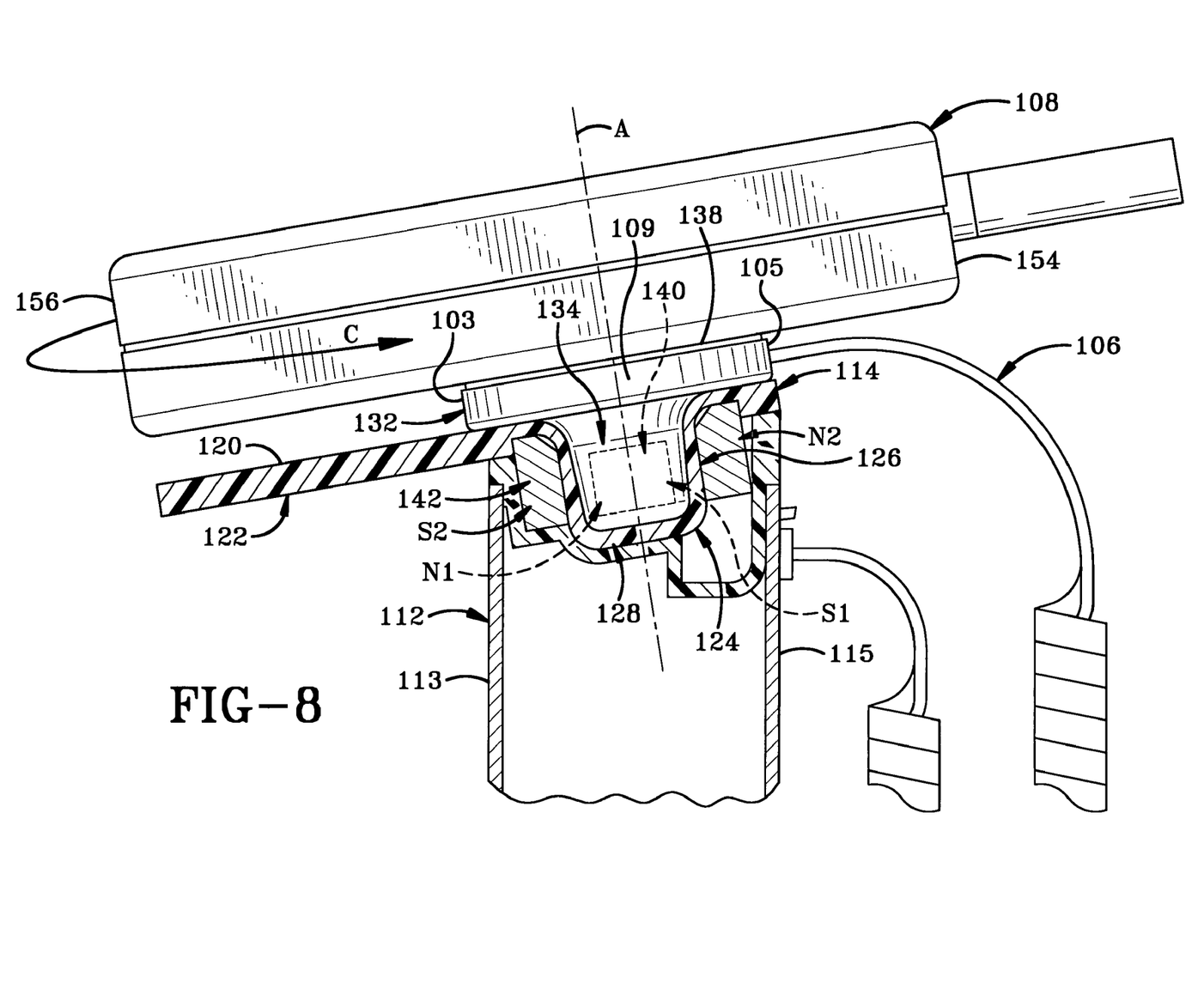
FIG. 8 is a fragmentary side elevational view with portions in section showing the mounting member and item of merchandise having rotated to the aligned display orientation.

FIG. 6 shows rotation of mounting member 104 and cell phone 108 (Arrows B) about an axis A which passes centrally through post 134. Said rotation is in response to the magnetic attraction between respective north and south poles N1 and S1 of first magnet 140 and south and north poles S2 and N2 of second magnet 142 and repulsion between like poles. FIG. 7 shows mounting member 104 and cell phone 108 having been rotated completely to the aligned display orientation. FIG. 8 shows mounting member 104 and cell phone 108 having rotated as indicated at Arrow C to the aligned display orientation so that north and south poles N1 and S1 of first magnet 140 are respectively aligned with south and north poles S2 and N2 of second magnet 142. This rotational movement of mounting member 104 and phone 108 occurs automatically simply by releasing mounting member 104 with post 134 in opening 118 without any additional force necessary beyond the magnetic attraction and repulsion described above. While it is possible to provide a magnetic field via the use of an electric current, it is preferred to utilize permanent magnets such as magnets 140 and 142 to provide a simple and cost efficient magnetically operable alignment mechanism.

Referring to FIGS. 9-10, display stand 200 is now described. Display stand 200 is similar to stand 100 in that it includes a base 202, a mounting member 204 and tether 106. Mounting member 204 is configured for mounting thereon an item of merchandise in the form of a camera 208 (FIG. 12) via a fastener 209 such as a screw or a bolt shown here extending through an elongated opening formed in mounting member 204. Any suitable mounting mechanism known in the art may be used for mounting an item of merchandise to mounting member 204. Mounting member 204 has a front 203, a rear 205 opposed thereto and first and second opposed sides 206 and 207. Base 202 is similar to base 102 in that it includes a foundation 110 and a column 212 which is similar to column 112. Column 212 has a front 213, a rear 215 opposed thereto and first and second opposed sides 216 (FIG. 11) and 217. Base 202 further includes a seating member 214 which is mounted atop column 212 via adhesive, sonic welding or any other suitable means known in the art.

Figure 12:
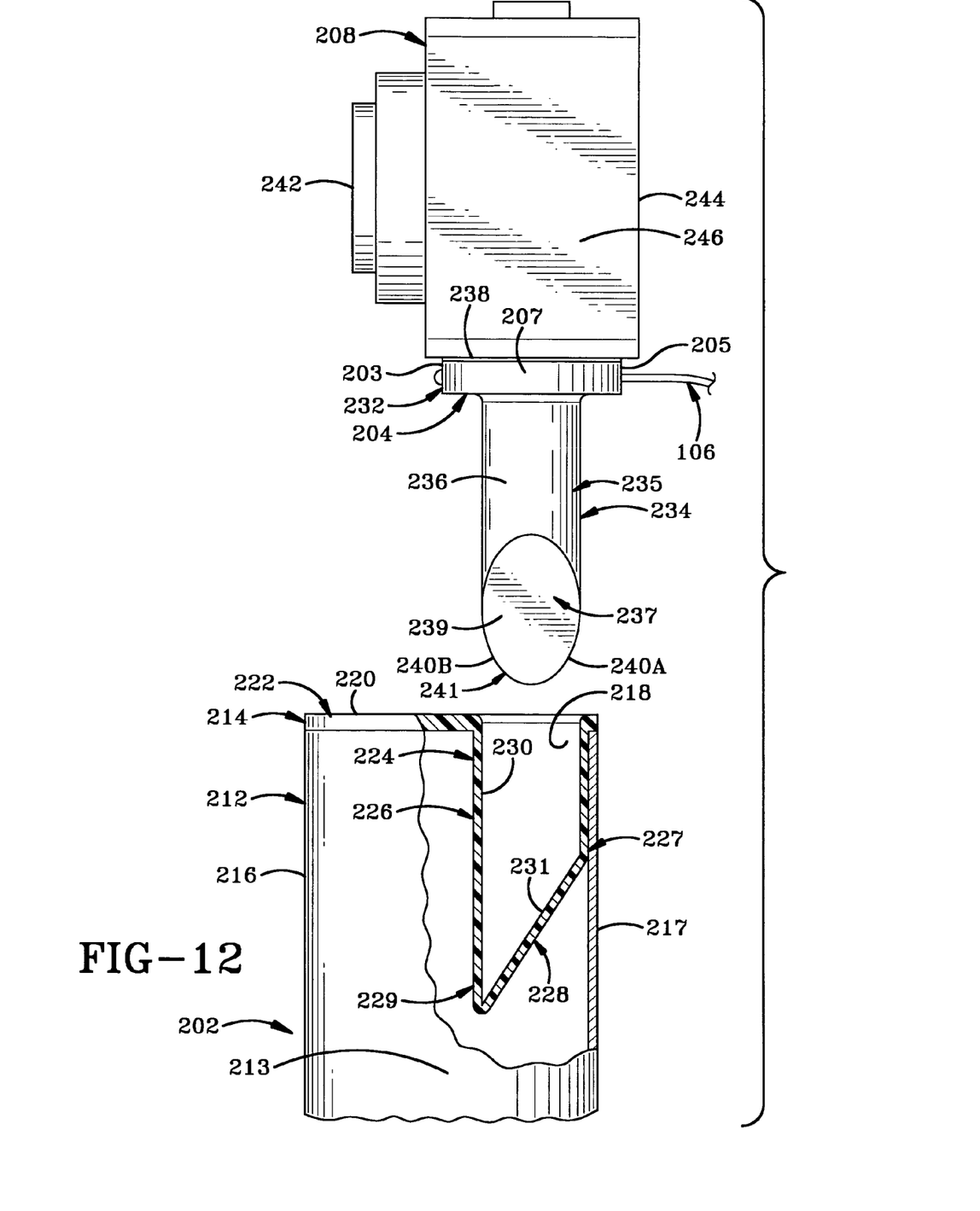
FIG. 12 is a side elevational view of the second embodiment with portions cut away to show a sectional view of portions of the base which form the opening therein, the mounting member with an article of merchandise mounted thereon with the post of the mounting member disposed above the opening in the base.

With reference to FIGS. 11-12, seating member 214 defines an opening 218 which extends downwardly from an upper surface 220 of member 214. More particularly, seating member 214 includes a seating plate 222 which defines flat upper surface 220. Member 214 further includes a cup-shaped member 224 extending downwardly from plate 222 in the form of a truncated cylinder. More particularly, member 224 includes a substantially cylindrical side wall 226 extending downwardly from plate 222 and an angled bottom wall 228 which in particular angles downwardly from a first side 227 of side wall 226 to a second opposed side 229 of side wall 226. Bottom wall 228 is substantially flat and has an oval shape. Cup-shaped member 224 has an inner surface 230 which is preferably smooth to promote slidable engagement with minimal friction between surface 230 and post 234. Inner surface 230 includes an inner or upper surface 231 of bottom wall 228. Upper surface 231 is substantially flat, angles downwardly from adjacent first side 227 to adjacent second side 229 of side wall 226 and is substantially oval in shape. Opening 218 is thus an interior chamber bounded by inner surface 230 of side wall 226 and bottom wall 228.

Mounting member 204 includes a merchandise mounting portion 232 having an upper surface 238 and a base mounting portion in the form of a post 234 which is connected to and extends downwardly from portion 232. Post 234 includes a substantially cylindrical side wall 235 having a substantially cylindrical and thus convex outer surface 236 which is smooth to promote easy sliding engagement with inner surface 230 of cup-shaped member 224. Post 234 further includes a substantially flat oval-shaped bottom wall 237 having a lower surface 239 which angles in a mating configuration with upper surface 231 of bottom wall 228 of cup-shaped member 224. Bottom wall 237 has an oval-shaped outer perimeter 241 lying along outer surface 236 of sidewall 235. Post 234 adjacent its lower end has first and second arcuate camming surfaces 240A and 240B which are located on perimeter 241 at the intersection of side wall 235 and bottom wall 237. Camming surfaces 240A and 240B alternately work in conjunction with upper surface 231 of bottom wall 228 in order to rotate mounting member 204 and camera 208 to the aligned displayed orientation as discussed further below. Each camming surface 240 is an arcuate surface which runs along the lower end of side wall 235. Each camming surface 240 is an arc of the oval outer perimeter 241 formed by the truncation of cylindrical side wall 235.

Operation of display stand 200 is described with reference to FIGS. 12-15. FIG. 12 shows mounting member 204 in the removed position with camera 208 mounted thereon. A front 242, rear 244 and opposed sides 246 and 248 (FIG. 15) of camera 208 may be used as reference points to clarify movement of mounting member 204 and camera 208 to an aligned display orientation.

Figure 13:
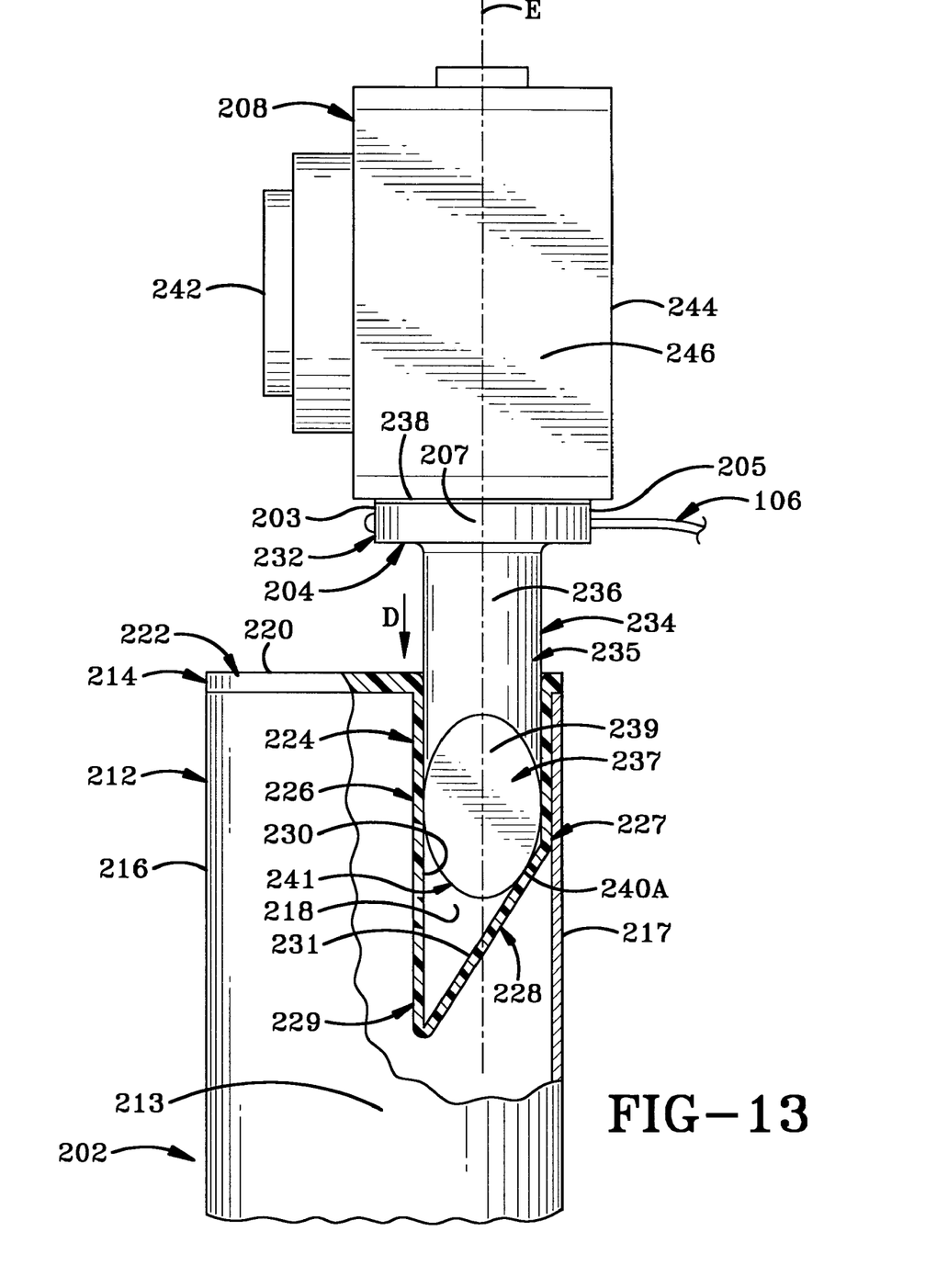
FIG. 13 is similar to FIG. 12 and shows the mounting member and article of merchandise having moved downwardly so that the post is disposed in the opening of the base and making initial contact with the angled camming wall of the base which bounds the opening.

FIG. 12 shows mounting member 204 with front 203 thereof facing toward first side 216 of column 212 and front 242 of camera 208 facing likewise. The user or potential customer returns mounting member 204 to its mounted position on base 202 with post 234 disposed in opening 218 by moving mounting member 204 and camera 208 downwardly as indicated at arrow D in FIG. 13. In the exemplary embodiment, this downward movement is linear parallel to a substantially vertical axis E which passes through the center of the post 234. FIG. 13 shows camming surface 240A at an initial point of engagement with upper surface 231 of bottom wall 228. Once post 234 is inserted within opening 218, the person handling camera 208 may simply release camera 208 and mounting member 204 and the force of gravity will pull member 204 and camera 208 further downwardly as indicated at arrow F in FIG. 14 as the camming engagement between camming surfaces 240A and 231 causes member 204 and camera 208 to rotate about axis E as indicated at arrow G whereby front 242 of camera 208 and front 203 of mounting member 204 move toward front 213 of column 212.

The combination of the downward movement and the rotational movement about axis E produces downwardly spiraling movement of member 204 and camera 208. During this movement, camming surface 240A slides downwardly and laterally along the angled inner surface 231 while outer surface 236 of side wall 235 of post 234 slidably engages inner surface 230 along side wall 226 of cup shaped member 224. Prior to the engagement of camming surface 240A and inner surface 231, this slidable engagement between surfaces 236 and 230 may simply be vertically downward in a linear fashion. Once camming surfaces 240 and 231 engage and cause the rotation of member 204 and camera 208, the sliding engagement between surfaces 236 and 230 includes the rotational movement and thus will also involve a downwardly spiraling slidable engagement therebetween. This downward spiraling movement continues until lower surface 239 of post 234 is seated in a mating fashion on upper surface 231 of mounting wall 228 at which time front 242 of camera 208 and front 203 of mounting member 204 are aligned with front 213 of column 212 and the associated rear portions and sides of these members are also respectively aligned. Thus, gravitational force moves member 204 and camera 208 downwardly and causes rotation via camming surfaces 240A and 231 to achieve the aligned display orientation of FIG. 15. No other force is required to achieve the display orientation which occurs automatically upon the release of camera 208 and member 204 with post 234 disposed within opening 218 of base 202.

Figure 14:
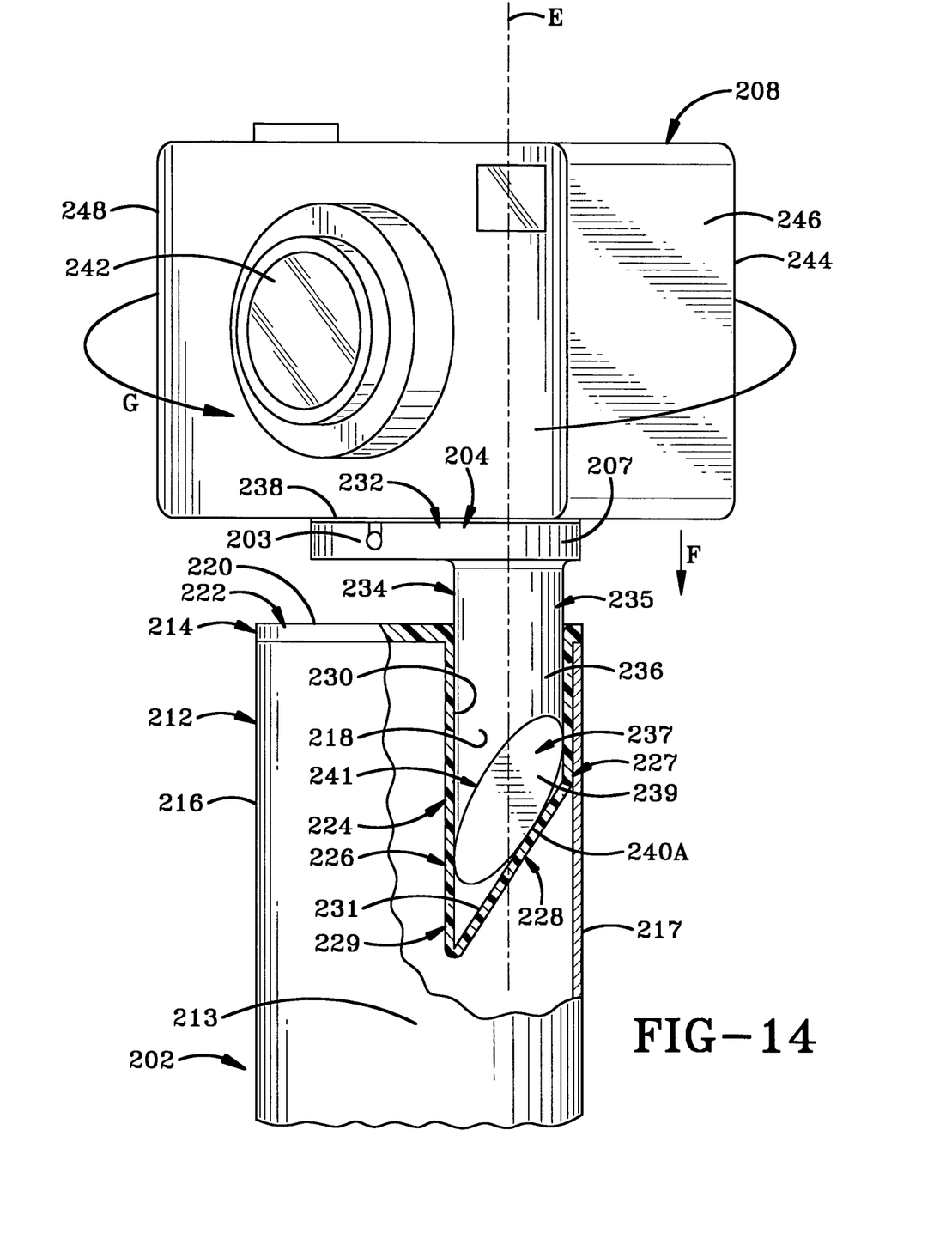
FIG. 14 is similar to FIG. 13 and shows the mounting member and article of merchandise rotating as they continue to move downwardly within the opening of the base.
Figure 15:
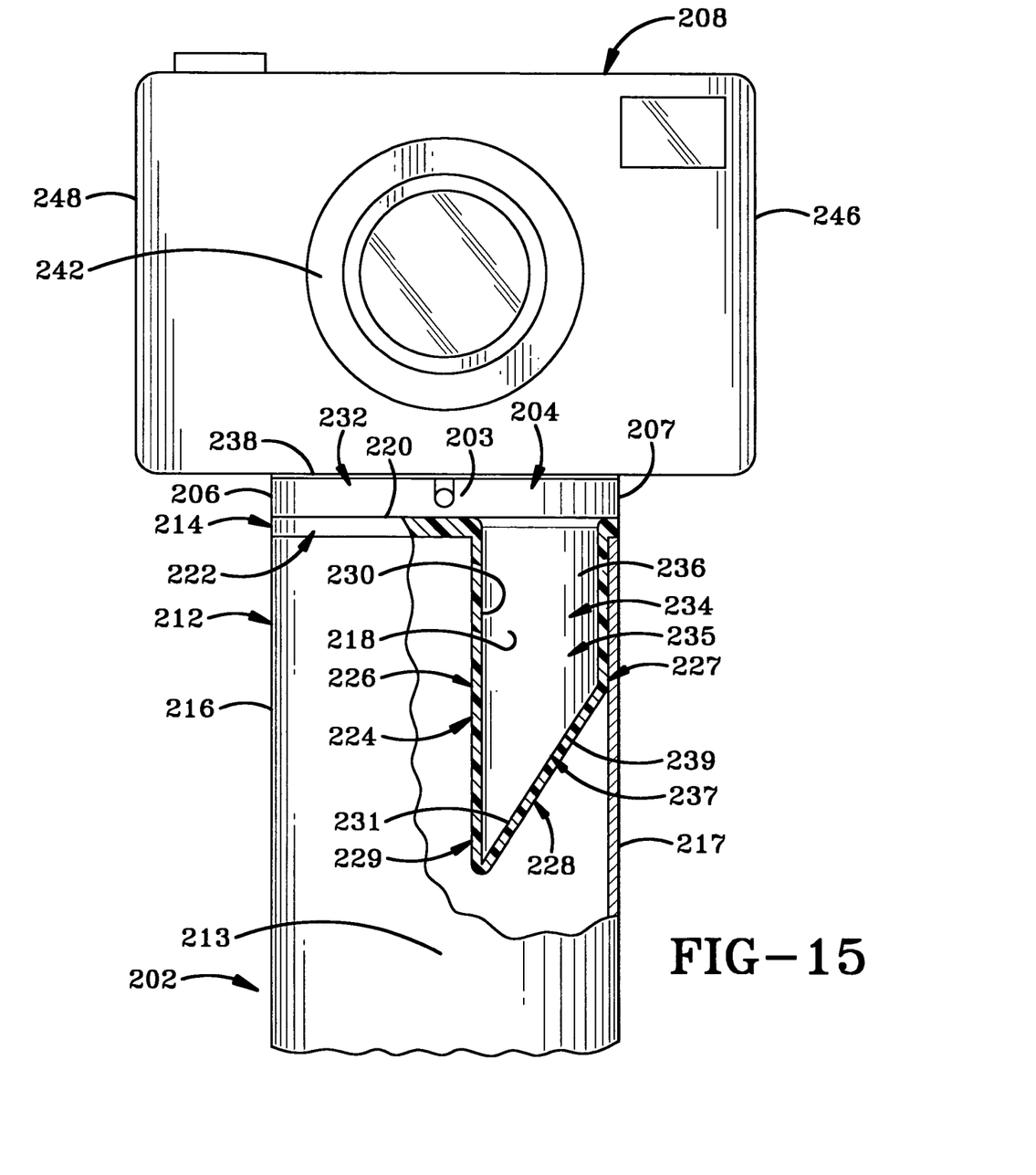
FIG. 15 is similar to FIG. 14 and shows the mounting member and article of merchandise having fully rotated and moved downwardly to the aligned display orientation.

Alternately, camming surface 240B may engage camming surface 231 to rotate member 204 and camera 208 about axis E in the opposite direction indicated by arrow G in FIG. 14. Display stand 200 thus provides a simple alignment mechanism for moving mounting member 204 and merchandise such as camera 208 from an unaligned orientation to an aligned display orientation as described.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A display assembly for displaying an item of merchandise, comprising:
   a base;
   a mounting member adapted for mounting thereon a display item; wherein the mounting member is movable between a mounted position in which the mounting member is in contact with the base and a removed position in which the mounting member is movable so that the mounting member is adapted to facilitate viewing and handling of the display item; wherein the mounting member when in the mounted position is rotatably movable between an unaligned orientation and an aligned display orientation; and
   a magnetically operable alignment mechanism for automatically moving the mounting member from the unaligned orientation to the aligned display orientation; wherein the alignment mechanism includes a first magnet mounted on the base and a second magnet mounted on the mounting member for magnetically rotating the mounting member to the aligned display orientation; wherein north and south poles of the first magnet align respectively with south and north poles of the second magnet in the aligned display orientation; and
   wherein one of the first and second magnets is a ring magnet which defines an opening in which the other of the first and second magnets is disposed when the mounting member is in the mounting position.

2. The assembly of claim 1 wherein one of the base and mounting member comprises a post and the other of the base and mounting member defines a base opening for removably receiving therein the post.

3. The assembly of claim 2 wherein the first magnet is the ring magnet; the ring magnet circumscribes the base opening defined by the other of the base and the mounting member; and the second magnet is mounted on the post.

4. A display assembly for displaying an item of merchandise, comprising
   a base;
   a mounting member adapted for mounting thereon a display item; wherein the mounting member is movable between a mounted position in which the mounting member is in contact with the base and a removed position in which the mounting member is removed from contact with the base and movable relative to the base so that the mounting member facilitates viewing and handling of the display item; wherein the mounting member when in the mounted position is rotatably movable between an unaligned orientation and an aligned display orientation; and a magnetically operable alignment mechanism for moving the mounting member from the unaligned orientation to the aligned display orientation in response to a magnetic attraction;

wherein a tether is connected to and extends between the base and the mounting member to secure the mounting member to the base while allowing movement of the mounting member relative to the base when in the removed position; the tether having a first end connected to the base and a second opposed end connected to the mounting member so that the tether extends from the base to the mounting member.

5. The assembly of claim 4 wherein the mounting member when in the mounted position is rotatable about an axis which extends in an axial direction and passes through a post on the mounting member; and the mounting member when in the mounted position rotates about the axis from the unaligned orientation to the aligned display orientation without moving in the axial direction.

6. The assembly of claim 4 further comprising a base opening formed in the base and a post on the mounting member removably received within the base opening; and wherein no portion of the tether is disposed within the base opening.

* * * * *